(12) United States Patent
Itakura et al.

(10) Patent No.: US 8,054,399 B2
(45) Date of Patent: Nov. 8, 2011

(54) LIQUID CRYSTAL DISPLAY

(75) Inventors: Shimon Itakura, Mobara (JP);
Fumihiko Hieda, Oamishirasato (JP);
Masaki Tsubokura, Mobara (JP)

(73) Assignees: Hitachi Displays, Ltd., Chiba (JP);
Panasonic Liquid Crystal Display Co., Ltd., Hyogo (JP)

( * ) Notice: Subject to any disclaimer, the term of this patent is extended or adjusted under 35 U.S.C. 154(b) by 182 days.

(21) Appl. No.: 12/649,420

(22) Filed: Dec. 30, 2009

(65) Prior Publication Data

US 2010/0171899 A1 Jul. 8, 2010

(30) Foreign Application Priority Data

Jan. 7, 2009 (JP) ................................. 2009-001771

(51) Int. Cl.
*G02F 1/1333* (2006.01)
(52) U.S. Cl. ......................................................... 349/58
(58) Field of Classification Search .................. None
See application file for complete search history.

(56) References Cited

U.S. PATENT DOCUMENTS

| | | | | |
|---|---|---|---|---|
| 6,880,953 | B2* | 4/2005 | Shin | 362/225 |
| 7,625,112 | B2* | 12/2009 | Ko et al. | 362/633 |
| 7,969,529 | B2* | 6/2011 | Ito et al. | 349/61 |
| 7,999,884 | B2* | 8/2011 | Na et al. | 349/58 |
| 2003/0016312 | A1 | 1/2003 | Park et al. | |
| 2004/0001340 | A1* | 1/2004 | Shin | 362/225 |
| 2006/0050518 | A1* | 3/2006 | Ko et al. | 362/382 |
| 2008/0143920 | A1 | 6/2008 | Back et al. | |
| 2008/0291367 | A1* | 11/2008 | Ota et al. | 349/70 |
| 2009/0027894 | A1* | 1/2009 | Jang et al. | 362/309 |

FOREIGN PATENT DOCUMENTS

| | | |
|---|---|---|
| JP | 2003-068125 | 3/2003 |
| JP | 2008-153217 | 7/2008 |

* cited by examiner

*Primary Examiner* — Timothy L Rude
(74) *Attorney, Agent, or Firm* — Antonelli, Terry, Stout & Kraus, LLP.

(57) ABSTRACT

An object of the invention is to provide a liquid crystal display of which a reduction in thickness can be realized without increasing the thickness of a frame member configuring a backlight. Also, another object is to provide a liquid crystal display which secures a sufficient property of insulation from electrode fittings and lamp cables.

A liquid crystal display includes a liquid crystal display panel, and a backlight disposed at the back of the liquid crystal display panel, wherein the backlight includes a frame member DFR which is of a rectangular box shape, a plurality of fluorescent lamps FL, disposed inside the frame member, each of which includes an electrode at either end, a first lamp cable CB1 for supplying lighting power to one of the electrodes of each fluorescent lamp, a second lamp cable CB2 for supplying lighting power to the other electrode of each fluorescent lamp, and a cable guide CG which, being disposed along an inside long-side edge of the frame member, holds the first and second lamp cables, wherein the cable guide includes a first opening through which the first and second lamp cables are led out, and wherein the frame member includes a second opening through which the first and second lamp cables led out from the cable guide are led out to the exterior of the frame member.

8 Claims, 5 Drawing Sheets

LIQUID CRYSTAL DISPLAY

The present application claims priority from Japanese application JP 2009-001771 filed on Jan. 7, 2009, the content of which is hereby incorporated by reference into this application.

BACKGROUND OF THE INVENTION

1. Technical Field

The present invention relates to a liquid crystal display, in particular, to a liquid crystal display including a backlight using fluorescent lamps.

2. Related Art

A liquid crystal display, accompanying a tendency of an increase in size of its liquid crystal display panel, often uses a direct-type backlight in which a plurality of linear light sources, or the like, such as external electrode fluorescent lamps (EEFL's) or cold cathode fluorescent lamps (CCFL's), are disposed on the same plane directly beneath the liquid crystal display panel.

Usually, with the backlight, a reflecting sheet or a reflecting plate is laid inside a metallic frame member, and a plurality of fluorescent lamps are disposed thereon. Power is supplied to both ends of the fluorescent lamps from a separately provided inverter circuit substrate, or power circuit including an inverter or the like.

The inverter circuit substrate and power circuit are usually disposed on the back surface of the frame member, and these substrates and both ends of the fluorescent lamps are connected by lamp cables. As an example showing this kind of structure, there is a patent document 1 (JP-A-2008-153217 (related U.S. Patent Application US2008/0143920A)).

In the heretofore known liquid crystal display, the lamp cables are wired outside the frame member, introduced into the inside of the frame member from positions close to the ends of the fluorescent lamps, and connected to both ends of the fluorescent lamps disposed inside the frame member.

On the other hand, as shown in a patent document 2 (JP-A-2003-68125 (related U.S. Patent Application (US2003/0016312A)), there is also an example in which a groove, in which lamps of a backlight are contained when wiring lamp wires through which power for the lamps is supplied, is provided in the top of a sidewall of a mold frame, and the lamp wires are disposed in the groove.

With the method of mounting the lamp cables outside the frame member, as in the patent document 1, it is necessary to secure a wiring space outside the frame member, and it is necessary to pay attention to a routing of the lamp cables outside the frame member. In particular, in a case in which the inverter substrate and power substrate are brought into one, as the length of the routed lamp cables also becomes greater, it becomes necessary to perform an assembly with more attention to an interference of the lamp cables with another circuit substrate, or the like. Also, in the kind of case of the patent document 2, as a special processing is needed for the mold frame (the frame member), a manufacturing cost increases, and it also causes an increased thickness of the sidewall of the frame. This affects a reduction in thickness and weight of the liquid crystal display.

Furthermore, in the case of the backlight of the EEFL's, electrode fittings on which the fluorescent lamps are connected in parallel, and the junctions of the lamp cables with the electrode fittings, usually have their conductive members exposed, requiring that a sufficient insulation property be secured between them and the metallic frame member. For this reason, forming an opening in the frame member in the vicinity of the electrode fittings and the junctions of the lamp cables with the electrode fittings, and introducing the lamp cables, also causes a reduction in the insulation property.

SUMMARY OF THE INVENTION

An object of the invention is to provide a liquid crystal display of which a reduction in thickness can be realized without increasing the thickness of a frame member configuring a backlight. Also, another object is to provide a liquid crystal display which secures a sufficient property of insulation from electrode fittings and lamp cables.

1. A liquid crystal display includes a liquid crystal display panel, and a backlight disposed at the back of the liquid crystal display panel. The backlight includes a frame member which is of a rectangular box shape, a plurality of fluorescent lamps, disposed inside the frame member, each of which includes an electrode at either end, a first lamp cable for supplying lighting power to one of the electrodes of each fluorescent lamp, a second lamp cable for supplying lighting power to the other electrode of each fluorescent lamp, and a cable guide which, being disposed along an inside long-side edge of the frame member, holds the first and second lamp cables. The cable guide includes a first opening through which the first and second lamp cables are led out. The frame member includes a second opening through which the first and second lamp cables led out from the cable guide are led out to the exterior of the frame member.

2. With the liquid crystal display according to 1 above, the cable guide is fixed to a sidewall of the frame member by snap fittings provided on the cable guide.

3. The liquid crystal display according to 1 above further includes electrode fittings which, as well as supporting the plurality of electrodes of the fluorescent lamps, supply power to the fluorescent lamps; and side molds which, supporting the electrode fittings, are disposed along inside short-side edges of the frame member. The cable guide and side molds have overlapping portions.

4. With the liquid crystal display according to 3 above, projections extended parallel to the short sides of the frame member are formed on each of the side molds.

5. With the liquid crystal display according to 1 above, a reflecting sheet is provided between the fluorescent lamps and the frame member. A gap is provided along the long-side edge of the frame member, between the reflecting sheet and the frame member, and the cable guide is disposed in the gap.

6. With the liquid crystal display according to 5 above, the reflecting sheet includes an inclined portion along the long-side edge of the frame member, and the cable guide includes an abutment portion which is a surface extending along the inclined portion of the reflecting sheet.

7. With the liquid crystal display according to 6 above, the cable guide includes a groove which, opening to the abutment portion, is for containing the lamp cables.

8. With the liquid crystal display according to 5 above, the cable guides are disposed on both long-side edges of the frame member.

According to the invention, as it is possible to dispose the lamp cables utilizing a space formed inside the frame member, it does not happen that the thickness of the frame member increases, and it is possible to reduce the thickness of the liquid crystal display. Moreover, as the lamp cables are contained in the cable guide, it does not happen that the lamp cables stray off into the frame member in an undesirable manner, and it is also possible to secure a high property of insulation from the frame member.

DESCRIPTION OF THE PREFERRED EMBODIMENT(S)

Hereafter, a description will be given, using the drawings, of an embodiment of a liquid crystal display according to the invention.

Figure 1:
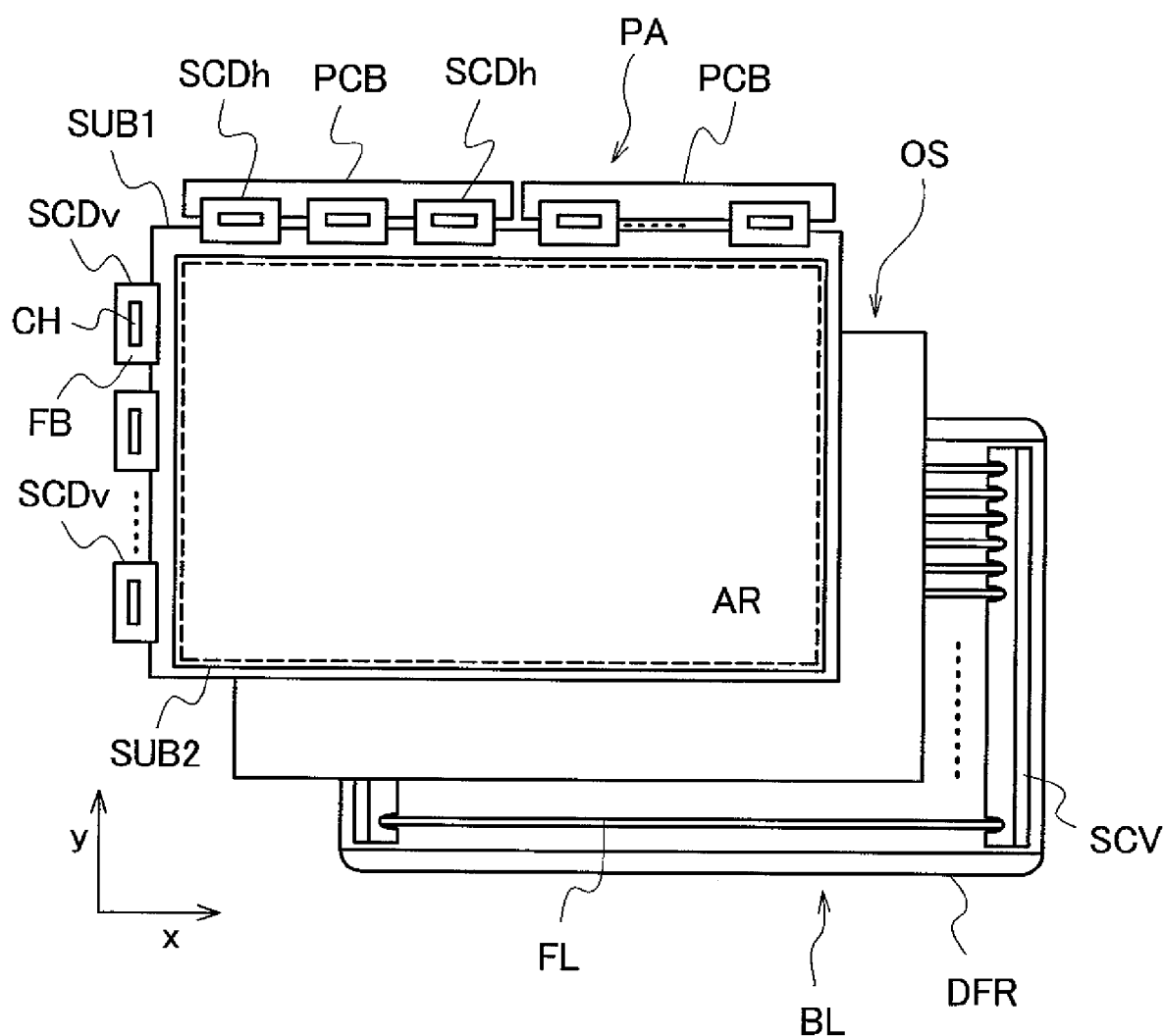
FIG. 1 is an overall configuration diagram of a liquid crystal display according to the invention.

FIG. 1 is a schematic configuration diagram of the liquid crystal display to which the invention is applied. Firstly, a liquid crystal display panel PA, an optical sheet OS, and a backlight BL are disposed in order from an observer's side.

The liquid crystal display panel PA includes a pair of substrates SUB1 and SUB2, made of, for example, glass, which are disposed in parallel, and liquid crystal is enclosed between the substrates SUB1 and SUB2.

Pixels (not shown) disposed in a matrix form being formed on the surfaces of the substrates SUB1 and SUB2 on the liquid crystal side, it is possible to control the light transmittance of the liquid crystal for each of the pixels.

Then, an area in which the pixels are formed being taken to be an image display area AR (an area surrounded by the dashed-dotted line in the diagram), the whole of the image display area AR is irradiated with light from the backlight BL, causing the observer to become aware of a video by means of the light transmitted through each pixel.

The substrate SUB1 disposed behind, as seen from the observer's side, including portions exposed from the substrate SUB2, for example, at the left edge and upper edge thereof in the diagram, one edge of each of a plurality of driver substrates SCDh and SCDv is connected thereto in the portions. The driver substrates SCDh and SCDv, being formed of a tape carrier package (TCP) called a so-called tape automated bonding (TAB), a chip on film (COF), or the like, are configured by a semiconductor chip CH being mounted on the top surface of a flexible substrate FB on which wiring is formed.

Each of the driver substrates SCDh and SCDv being a circuit which causes each pixel to be driven independently, for example, the driver substrates SCDv disposed in parallel in a y direction in the diagram are scanning signal drive circuits, and the driver substrates SCDh disposed in parallel in an x direction in the diagram are video signal drive circuits.

Printed circuit boards PCB being connected to the plurality of driver substrates SCDh, which are the video signal drive circuits, at the other edges opposed to the edges connected to the substrate SUB1, external input signals are input thereinto through the printed circuit boards PCB.

The plurality of driver substrates SCDv, which are the scanning signal drive circuits, are provided with no substrates corresponding to the printed circuit boards PCB because the external input signals are input thereinto through wiring (not shown) formed on the surface of the substrate SUB1.

The backlight BL is disposed at the back of the liquid crystal display panel PA configured in this way, across an optical seat unit (an optical member) OS formed of laminated bodies such as, for example, a prism sheet and a diffuser plate. The optical member OS diffuses and collects the light from the backlight BL, and leads it to the liquid crystal display panel PA side.

The backlight BL, being called a so-called direct type, is of a configuration such that a plurality of fluorescent lamps FL, which are linear light sources, are disposed in parallel inside a box-shaped casing (a frame member DFR). In the embodiment, the fluorescent lamps FL are external electrode fluorescent lamps (EEFL's), but it is also acceptable that they are cold cathode fluorescent lamps (CCFL's).

Figure 2:
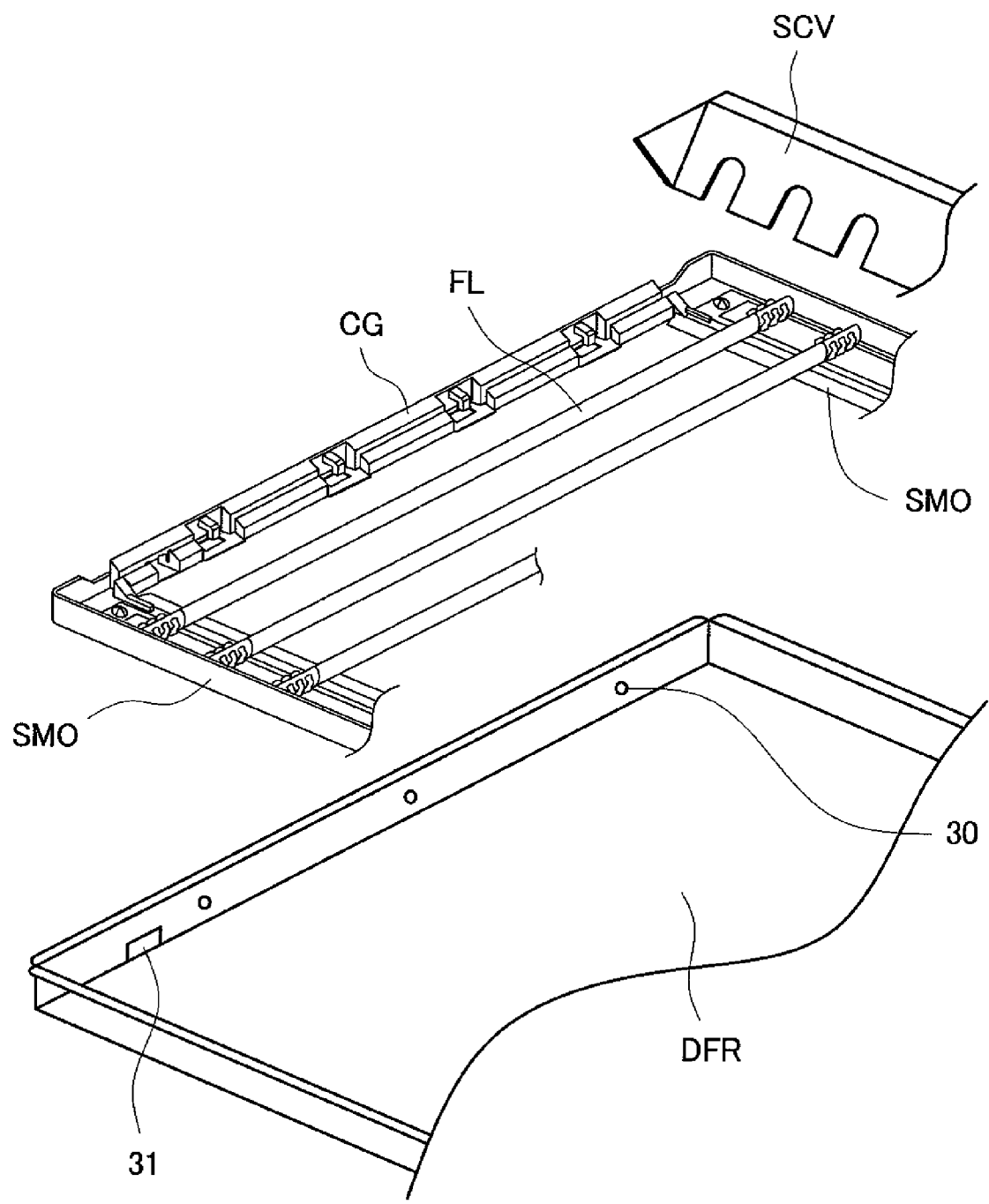
FIG. 2 is an exploded perspective view of a backlight used in the liquid crystal display according to the invention.

FIG. 2 is an exploded perspective view of the backlight BL using the EEFL's as the fluorescent lamps FL. Inside the metallic frame member DFR, side molds SMO made of an insulating member are provided at either short-side edge thereof, and an electrode fitting, which fixes the electrode portions of the fluorescent lamps FL, and supplies power to the fluorescent lamps FL, is installed on each side mold SMO. Furthermore, a side cover SCV made of a white insulating member is disposed on each side mold SMO in such a way as to cover the electrode fitting and the electrode portions of the fluorescent lamps FL after fixing the fluorescent lamps FL to the electrode fittings.

With the liquid crystal display according to the invention, in particular, cable guides CG are provided at both inside long-side ends of the frame member DFR, and between the side molds SMO disposed at either short-side edge. The cable guides CG are for holding lamp cables connected to the electrode fittings.

Figure 3:
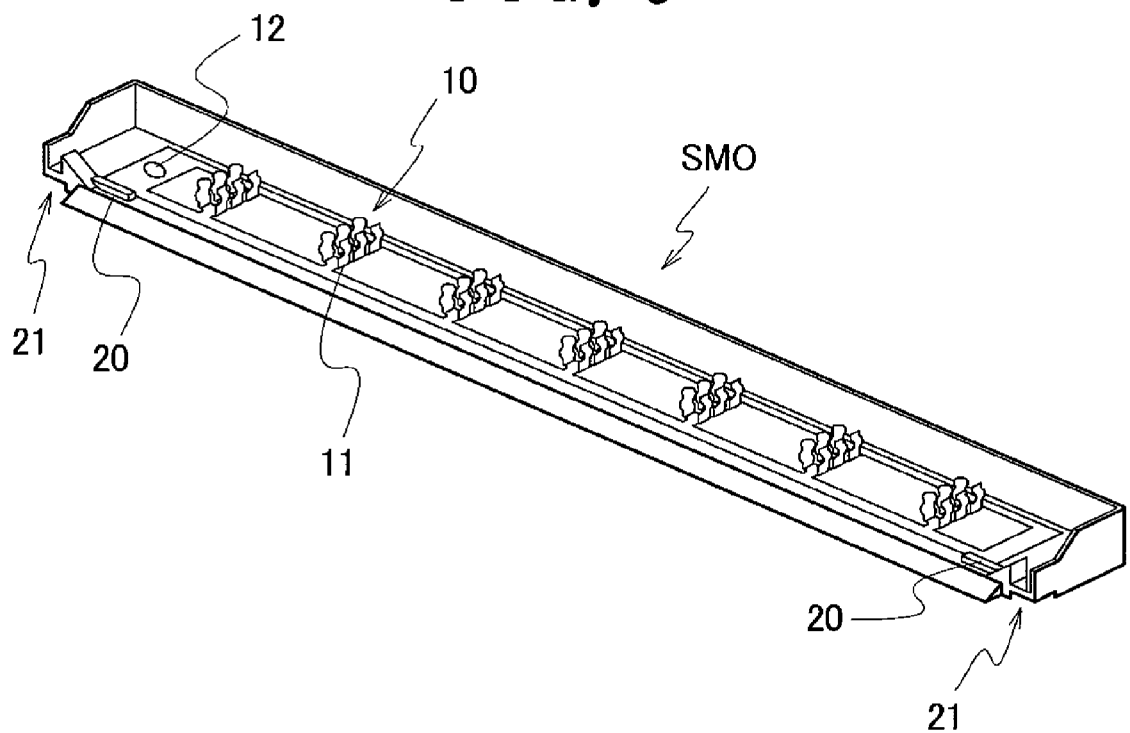
FIG. 3 is a perspective view of a side mold used in the liquid crystal display according to the invention.

FIG. 3 is a perspective view of the side mold SMO, and the electrode fitting 10 is disposed on the side mold SMO. Clamps 11 for holding the electrodes of the external electrode fluorescent lamps, and supplying power to the electrodes, are formed on the electrode fitting 10. Also, an opening 12 being formed in one portion of the electrode fitting 10, a screw with which to fix the electrode fitting 10 to the side mold SMO is inserted into the opening 12. It is also possible, using the screw, to connect the unshown lamp cables to the electrode fitting.

Figure 4:
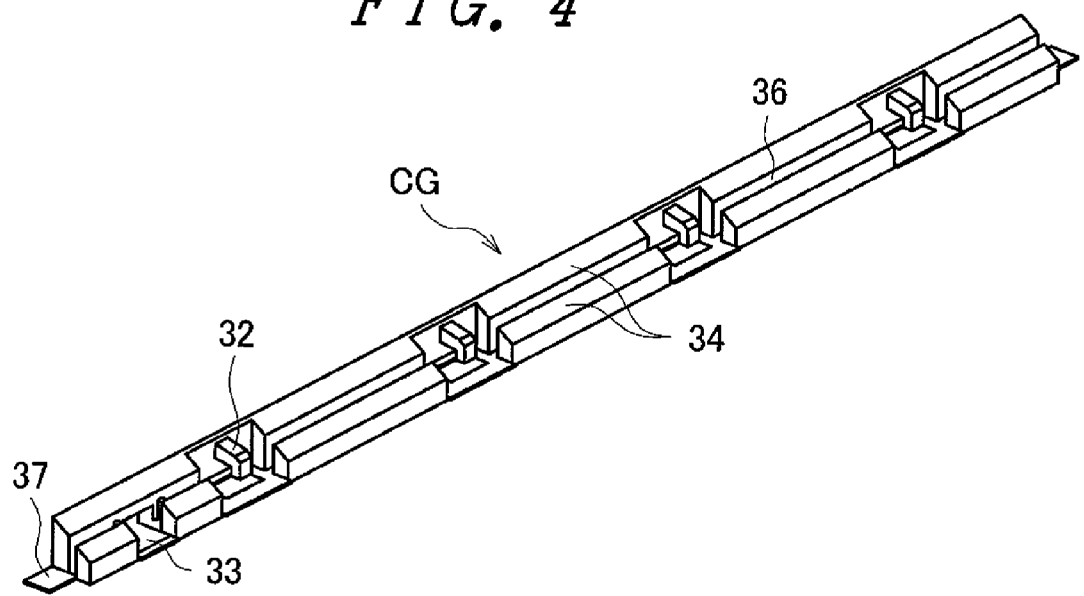
FIG. 4 is a perspective view of a cable guide used in the liquid crystal display according to the invention.
Figure 5:
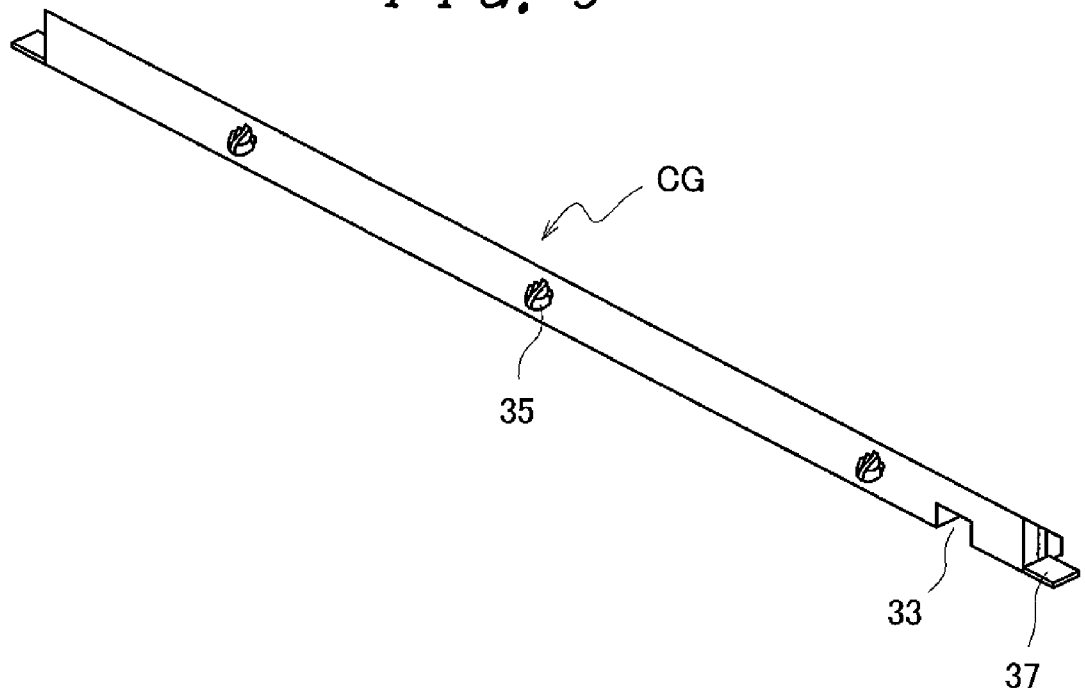
FIG. 5 is a perspective view of the cable guide shown in FIG. 4, seen from the back thereof.

FIGS. 4 and 5 being perspective views of the cable guide CG, FIG. 4 illustrates a condition seen from inside the frame member, while FIG. 5 illustrates a condition seen from outside the frame member. A groove 36 for containing the lamp cables, and hooks 32 for fixing the lamp cables, are formed in the cable guide CG. This kind of groove 36 enables the lamp cables to be stably fixed in the cable guide, it does not happen that the lamp cables stray off into the frame member in an undesirable manner, and it is also possible to secure a high property of insulation from the frame member.

Also, snap fittings 35 are provided on the back surface side of the cable guide CG, as shown in FIG. 5, and by inserting the snap fittings 35 into openings 30 of the frame member DFR shown in FIG. 2, it becomes possible to fixedly dispose the cable guides CG easily in predetermined positions inside the frame member DFR. As the snap fittings 35 are inserted into sidewalls of the frame member DFR in this way, a direction in which the snap fittings 35 project is also toward the sidewall side of the frame member DFR, preventing an increase in thickness of the frame member DFR. Reference numeral 33 indicates a lead-out port (a first opening) of the lamp cables, forming a communication hole with an opening (a second opening) 31 provided in the frame member DFR of FIG. 2.

Figure 6:
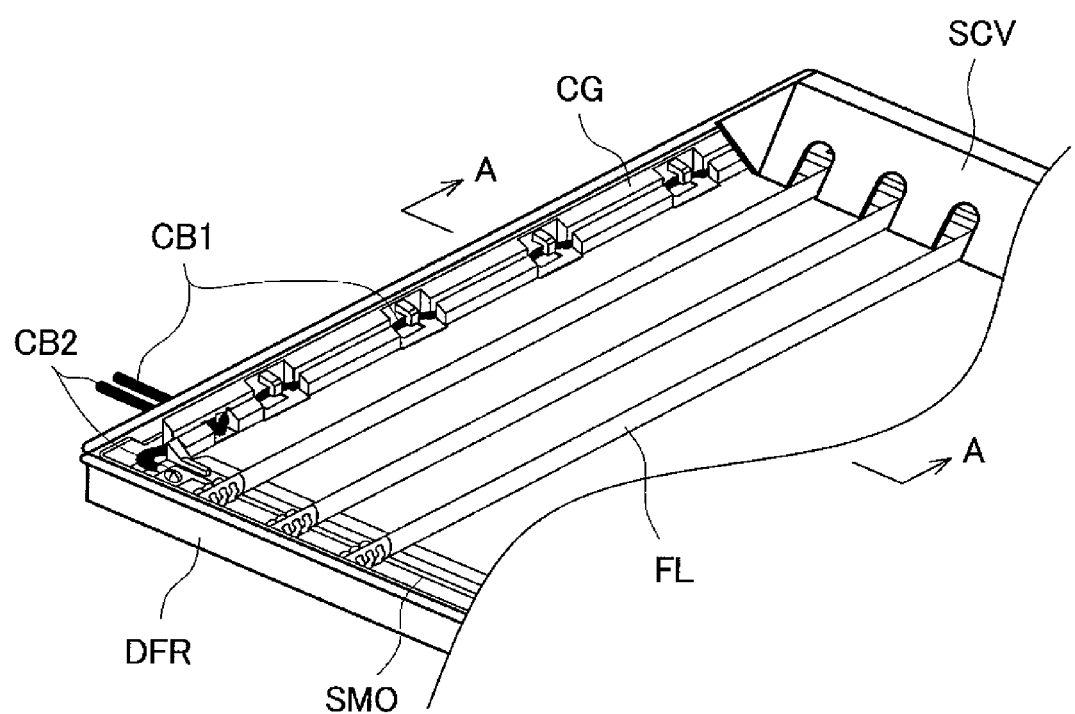
FIG. 6 is a diagram showing an assembled condition of the backlight used in the liquid crystal display according to the invention.
Figure 7:
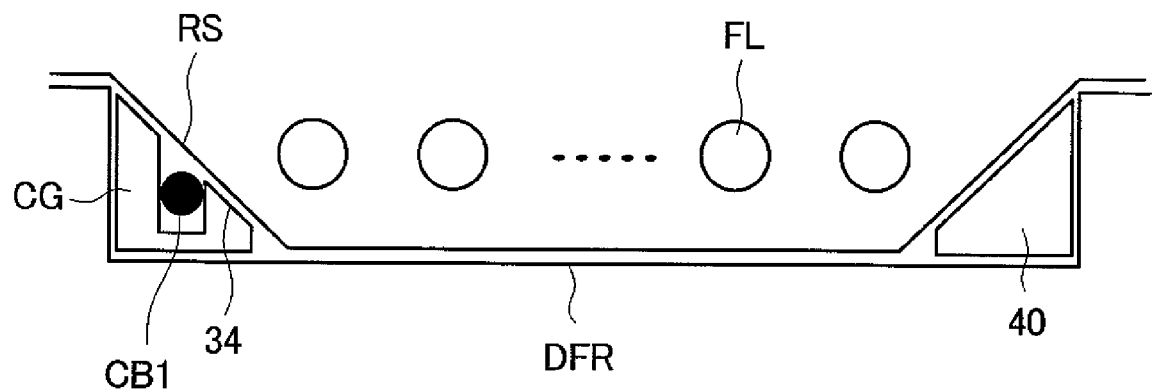
FIG. 7 is a sectional view taken along arrow A-A in FIG. 6.

FIG. 6 shows a condition in which, as well as the side molds SMO, cable guide CG, fluorescent lamps FL, side cover SCV, and the like being built into the inside of the frame member DFR, the lamp cables (a first lamp cable CB1 and a second lamp cable CB2) are disposed and fixed. Also, FIG. 7 shows a sectional view taken along arrow A-A of FIG. 6. In FIG. 6, a reflecting sheet RS is omitted.

As shown in FIG. 6, by using the cable guide CG, it is possible to bring portions through which the lamp cables are led out from the frame member DFR into one place. Because of this, there is no need to take into account a routing of the lamp cables outside the frame member DFR. Furthermore, due to the fact that the lamp cables can be routed inside the frame member, it does not happen that the thickness of the frame member increases, and it is also possible to reduce the thickness of the liquid crystal display.

Also, as shown in FIG. 7, an abutment portion 34 which comes into abutment with the back surface of the reflecting sheet RS is formed on the cable guide CG. The abutment portion 34 is formed in such a way that the inclination angle thereof is an angle the same as the inclination of both ends of the reflecting sheet RS. By means of this kind of cable guide CG, it is possible to effectively use a space between the reflecting sheet RS and the frame member DFR, instead of the space becoming a dead space.

Also, by providing this kind of cable guide CG, it is possible to hold the reflecting sheet RS while maintaining it in a predetermined shape. Also, as the reflecting sheet RS is stably held in a predetermined position, it is also possible to suppress an unevenness and fluctuation in an amount of light of the backlight.

Furthermore, in order to make the holding of the reflecting sheet RS more reliable, it is possible to provide a support member 40 on the other side opposed to the cable guide CG, too, as shown in FIG. 7. It is also possible to substitute the cable guide CG for this kind of support member 40.

A contraption which increases the property of insulation of the metallic frame member from the electrode fittings and lamp cables, in particular, positions of attachment of the electrode fittings and lamp cables, is employed for the side molds SMO and cable guides CG utilized in the liquid crystal display of the invention.

As shown in FIG. 3, projections 20 are formed on the side mold SMO, increasing creepage distances between the electrode fitting 10, and the frame member DFR and the lamp cables inside the cable guide CG (a creepage distance, being a distance between metal members, is calculated along an insulating member surface existing between the metal members. The distance being used as an index indicating security against an electrical short between the metal members, it can be said that the longer the distance, the higher the security).

Also, an inclined portion with an inclination angle the same as the inclination angle of the abutment portion 34 of the cable guide CG is formed next to each projection 20. Protruding portions 37 of the cable guide CG of FIG. 4, and recessed portions 21 of the side molds SMO, are configured in such a way as to overlap each other at a time of assembly, maintaining continuity between the cable guides CG and the side molds SMO. By this means, it is also possible to increase the creepage distances between the electrode fittings 10 and the frame member DFR and cable guides CG.

As above, according to the invention, it is possible to provide a liquid crystal display of which a reduction in thickness can be realized without increasing the thickness of the frame member configuring the backlight. Also, it is also possible to provide a liquid crystal display which secures a sufficient property of insulation from the electrode fittings and lamp cables.

What is claimed is:

1. A liquid crystal display comprising:
   a liquid crystal display panel; and
   a backlight disposed at the back of the liquid crystal display panel, wherein
   the backlight includes a frame member which is of a rectangular box shape, a plurality of fluorescent lamps, disposed inside the frame member, each of which includes an electrode at either end, a first lamp cable for supplying lighting power to one of the electrodes of each fluorescent lamp, a second lamp cable for supplying lighting power to the other electrode of each fluorescent lamp, and a cable guide which, being disposed along an inside long-side edge of the frame member, holds the first and second lamp cables, wherein
   the cable guide includes a first opening through which the first and second lamp cables are led out, and wherein
   the frame member includes a second opening through which the first and second lamp cables led out from the cable guide are led out to the exterior of the frame member.

2. The liquid crystal display according to claim 1, wherein the cable guide is fixed to a sidewall of the frame member by snap fittings provided on the cable guide.

3. The liquid crystal display according to claim 1, further comprising:
   electrode fittings which support the plurality of electrodes of the fluorescent lamps, and supply power to the fluorescent lamps; and side molds which support the electrode fittings, are disposed along inside short-side edges of the frame member, wherein
   the cable guide and side molds have overlapping portions.

4. The liquid crystal display according to claim 3, wherein projections extended parallel to the short sides of the frame member are formed on each of the side molds.

5. The liquid crystal display according to claim 1, wherein
   a reflecting sheet is provided between the fluorescent lamps and the frame member, wherein
   a gap is provided along the long-side edge of the frame member, between the reflecting sheet and the frame member, and the cable guide is disposed in the gap.

6. The liquid crystal display according to claim 5, wherein the reflecting sheet includes an inclined portion along the long-side edge of the frame member, and the cable guide includes an abutment portion which is a surface extending along the inclined portion of the reflecting sheet.

7. The liquid crystal display according to claim 6, wherein the cable guide includes a groove which opens to the abutment portion, is for containing the lamp cables.

8. The liquid crystal display according to claim 5, wherein the cable guides are disposed on both long-side edges of the frame member.

* * * * *